United States Patent
Deep et al.

(10) Patent No.: US 7,208,217 B2
(45) Date of Patent: Apr. 24, 2007

(54) STORAGE AND DELIVERY ARTICLE FOR HIGHLY VISCOUS FLUID

(75) Inventors: William D. Deep, Richmond, VA (US); Constance Shanahan Donnelly, Richmond, VA (US); James David Tribble, Brazil, IN (US)

(73) Assignee: Tredegar Film Products Corporation, Richmond, VA (US)

( * ) Notice: Subject to any disclaimer, the term of this patent is extended or adjusted under 35 U.S.C. 154(b) by 102 days.

(21) Appl. No.: 10/890,338

(22) Filed: Jul. 13, 2004

(65) Prior Publication Data

US 2006/0013999 A1 Jan. 19, 2006

(51) Int. Cl.
*B32B 3/10* (2006.01)
*A61F 13/00* (2006.01)

(52) U.S. Cl. ............. 428/137; 428/138; 428/178; 424/443; 604/385.01

(58) Field of Classification Search ......... 428/137, 428/138, 172, 166, 178; 424/400–404, 443; 604/385.01
See application file for complete search history.

(56) References Cited

U.S. PATENT DOCUMENTS

| | | | |
|---|---|---|---|
| 4,515,703 A | 5/1985 | Haq | |
| 5,508,102 A | 4/1996 | Georger et al. | |
| 5,968,633 A | 10/1999 | Hamilton et al. | |
| 5,980,931 A | 11/1999 | Fowler et al. | |
| 6,063,397 A | 5/2000 | Fowler et al. | |
| 6,074,655 A | 6/2000 | Fowler et al. | |
| 6,099,940 A | 8/2000 | Hamilton et al. | |
| 6,132,746 A | 10/2000 | Hasenoehrl et al. | |
| 6,132,841 A | 10/2000 | Guthrie et al. | |
| 6,153,208 A | 11/2000 | McAtee et al. | |
| 6,190,678 B1 | 2/2001 | Hasenoehrl et al. | |
| 6,257,785 B1 | 7/2001 | Otten et al. | |
| 6,270,875 B1 | 8/2001 | Nissing | |
| 6,280,757 B1 | 8/2001 | McAtee et al. | |
| 6,491,928 B1 | 12/2002 | Smith, III | |
| 6,495,151 B2 | 12/2002 | McAtee et al. | |
| 6,537,930 B1 | 3/2003 | Middlesworth et al. | |
| 6,547,468 B2 | 4/2003 | Gruenbacher et al. | |
| 6,550,092 B1 | 4/2003 | Brown et al. | |
| 6,582,798 B2 * | 6/2003 | Thomas | 428/132 |
| 6,607,739 B1 | 8/2003 | Wallo | |
| 6,610,904 B1 | 8/2003 | Thomas et al. | |
| 6,613,732 B2 | 9/2003 | Suazon et al. | |
| 6,623,834 B1 | 9/2003 | Nissing et al. | |
| 6,627,291 B1 | 9/2003 | Clark et al. | |
| 6,683,041 B1 | 1/2004 | Nissing et al. | |
| 6,719,740 B2 | 4/2004 | Burnett et al. | |
| 2001/0029966 A1 | 10/2001 | Wong et al. | |
| 2003/0186026 A1 | 10/2003 | Thomas | |

FOREIGN PATENT DOCUMENTS

| | | |
|---|---|---|
| WO | WO 00/27271 | 5/2000 |
| WO | WO 00/44270 | 8/2000 |
| WO | WO 01/22860 A1 | 4/2001 |

* cited by examiner

*Primary Examiner*—Donald J. Loney
(74) *Attorney, Agent, or Firm*—Troutman Sanders LLP

(57) ABSTRACT

An article having a top sheet, a core layer and, optionally, a barrier layer is configured to provide storage and metered release of a highly viscous fluid to a target surface. The core layer contains an array of three dimensional voids, which may be opened (i.e., apertured) or closed, that are configured to receive and store the fluid, and is formed of a material that is non-absorbent with respect to the fluid.

16 Claims, 4 Drawing Sheets

STORAGE AND DELIVERY ARTICLE FOR HIGHLY VISCOUS FLUID

BACKGROUND

Certain embodiments relate to articles for delivering viscous fluids, and more particularly to wiping articles or applicators configured to be loaded with a highly viscous fluid and to release a high percentage of the fluid during use.

A wide variety of articles exist today for delivering certain types of fluids to a target surface, such as for cleaning or treating human or animal skin, hard surfaces (e.g., wood, metal, glass, plastic, floors, kitchen counter tops or automobiles) and the like. Conventional delivery articles comprise one or more layers of woven or non-woven fiber (natural or synthetic) that is saturated with a cleansing or treatment fluid. Typically, delivery articles having a fibrous core have been desirable because they have a high percentage wet weight to dry weight, which means the article will hold a large volume of fluid by weight relative to the dry weight of the article. The fluids chosen for use in such conventional delivery articles should exhibit a high release percentage. In order for a fluid to offer a high release percentage from a fibrous core, the fluid should have very low viscosity. For example, water has a viscosity of 1 centipoise (Cp). Fluids that are utilized with delivery articles having fibrous cores typically comprise a large percentage of water, thereby affording low viscosities (e.g., less than 15 cp).

Heretofore, delivery articles have experienced limitations in terms of the type of fluids that may be used therewith. More specifically, delivery articles that utilize a fibrous core as the storage layer retain an excessively high percentage of fluids when used with fluids having high viscosity because the fibrous cores exhibit a low percentage release for highly viscous fluids. Thus, when conventional fibrous delivery articles are saturated with a highly viscous fluid, a smaller than desired percentage of the fluid is released during use. The remaining fluid is bound or trapped within the fibers of the article and is never released, thereby creating inefficiency, waste and increased cost.

A need remains for improved storage and delivery articles for use with highly viscous fluids that afford high release percentages and uniform, even distribution over a target surface.

BRIEF SUMMARY OF THE EMBODIMENTS

A delivery article is provided that is configured to store and release a highly viscous fluid. The article includes a top sheet, a core layer and an optional barrier layer. The top sheet is porous to permit metered discharge of the highly viscous fluid therethrough to a facing surface of the top sheet for application to a target surface. The core layer contains an array of three dimensional voids or cones that are configured to receive and store the fluid. The bottom of the voids or cones may be open or closed. The core layer is formed of a material that is non-absorbent with respect to the fluid and affords high void volume. The barrier layer is impermeable to the fluid and has a side bonded to a back side of the core layer to close open back ends of the voids. Alternatively, when the core layer is formed of a three dimensional material with the back ends of the voids closed, the barrier layer may be removed or included, but not necessarily bonded to each void.

Optionally, the core layer may comprise a three dimensional structure defined by ribs having walls extending in a Z-direction and spaced apart from one another to form interior cavities therebetween. Optionally, the fluid may have a viscosity of at least 500 centipoise and the article may exhibit a release percentage of at least 70%. The voids may be funnel shaped and flared outward proximate front and back sides of the core layer.

DETAILED DESCRIPTION OF THE EMBODIMENTS

The term "fluid," is used throughout broadly, to include any substance exhibiting flowing characteristics. The fluid need not be liquid.

The term "highly viscous" is used throughout to refer to viscosities substantially greater than the viscosity of water and greater than the viscosity of liquids heretofore stored in conventional fibrous delivery articles, where such liquids yielded high release percentages from the fibrous delivery article. For example, fluids that are highly viscous may have a viscosity of at least 500 centipoise, or more preferably may have a viscosity of at least 1000 centipoise. An exemplary upper limit for the viscosity of a substance to still be considered a fluid may be 10,000 centipoise. Examples of fluids include body creams, lotions, disinfectants, topical medications, dermatological substances, household and automobile cleaners, and the like.

Figure 1:
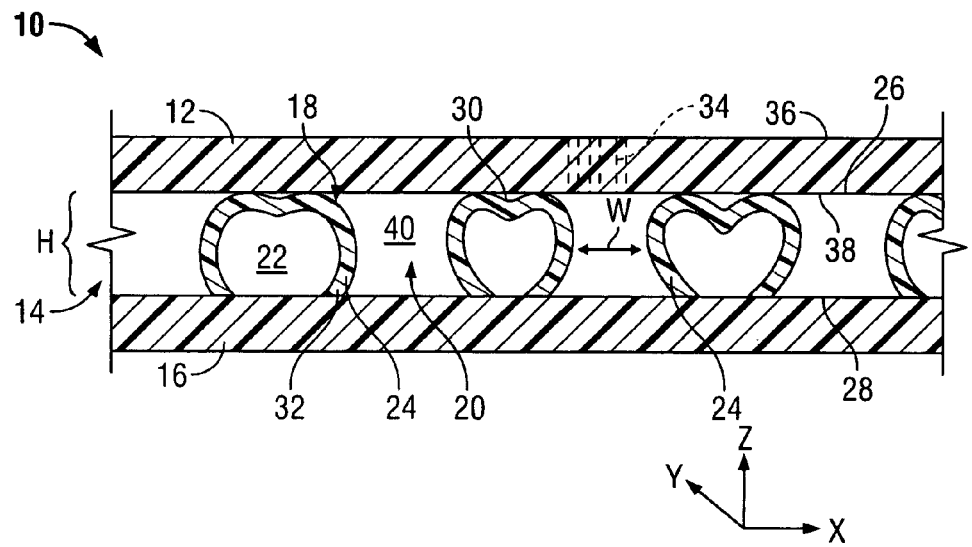
FIG. 1 is a cross sectional view of an article formed in accordance with an embodiment.

FIG. 1 illustrates a cross-sectional view of a storage and delivery article 10 configured to be loaded with a highly viscous fluid 40 and to apply the fluid 40 to a target surface, such as skin, wood, metal, plastic, glass and the like. Examples of applications for the article 10 include personal care uses (e.g., applying a lotion or cream to human or animal hair or skin), dermatological uses, application of substances to hide or reduce stretch marks, medical uses (e.g., applying topical medications, disinfectants or pharmacologicals to skin), cleaning of hard surfaces (e.g., floors, countertops, automobiles), drug delivery and the like.

The article 10 comprises a cover or top sheet 12, a storage/delivery core layer 14 and a barrier layer 16, all of which extend in the X- and Y-directions to provide a useful applicator surface. The core layer 14 provides a stationary support configured to store the highly viscous fluid 40 until release is desired. The core layer 14 may be constructed as a formed film having a three dimensional (3D) structure containing a plurality of fluid storage voids 20. The 3D structure is defined by ribs 18 that have walls 24 that surround the voids 20 and extend in the Z-direction. Each rib 18 has a pair of opposed walls 24 that are spaced apart from one another to form isolated interior cavities 22 there between. The core layer 14 includes a front side 26 and a back side 28. The voids 20 may be funnel or cylinder in shape or may flare outward proximate the front and/or back sides 26 and 28 into an hour-glass shape. The voids 20 have a central width W that may be less than a height H of each void 20 when in an at rest state (e.g., not under compression). Optionally, the voids 20 may have an aspect ratio of 1 (e.g., equal height and width). Optionally, the height H of each void 20 may be less than the width W. The walls 24 of individual ribs 18 join with one another at a slightly depressed apex 30 which collectively define the front side 26. Lower ends 32 of the walls 24 define the back side 28 of the core layer 14.

The core layer 14 is constructed with a large percentage of open area (e.g., a high void volume) by providing a large number of voids 20 in the 3D structure. The fluid storage capacity of the core layer 14 may be varied by adjusting the number of voids 20 or mesh count and/or by adjusting the dimensions of the voids 20. By way of example only, the core layer 14 may have a nominal 12 voids per square centimeter and each cavity 20 may have a nominal 800 micron cell diameter and 950–1200 micron cell height. The core layer 14 may be similar to the films described in U.S. Pat. No. 6,610,904, the disclosure of which is hereby expressly incorporated by reference in its entirety. Examples of materials from which the core layer 14 is formed include, among other things, polyolefin based materials such as polyethylene, polypropylene, and polybutylene, and polyester based materials such as polyethyleneterephthalate, copolymers thereof, and the like. The core layer 14 may be formed of other materials that are non-absorbent or impervious to the fluid 40 and that do not chemically react with the fluid 40.

The barrier layer 16 may be formed of a material impervious to the fluid 40. For example, the barrier layer 16 may be paper, tissue, plastic film, a non-woven or woven material, as well as laminates or composite webs formed from various combinations of films, non-woven and/or woven webs. The barrier layer 16 can be embossed or non-embossed and, if used, is the layer closest to, or held in, the hand of the user. Optionally, barrier layer 16 may be held against an applicator device, to which the article 10 is attached, such as a mop, a handle, medical applicator, a surgical tool and the like. In one embodiment, the barrier layer 16 is bonded to the lower open ends 32 of the walls 24 to individually close the lower ends of the voids 20. Once the barrier layer 16 is joined to the core layer 14, the voids 20 form individual open-faced storage cells. The barrier layer 16 induces a pumping action upon the voids 20 during use. Optionally, the voids 20 may not be apertured, but instead closed at the back or rear end. When using closed voids 20, the barrier layer need not be bonded to the individual voids 20.

The top sheet 12 is porous to enable metered delivery of the fluid 40 to the target surface. The top sheet 12 includes a facing surface 36 and a backing surface 38. The top sheet 12 is joined to the core layer 14 about the perimeter of the article 10, while a central portion of the top sheet 12 abuts against the front side 26 of the core layer 14. In the embodiment of FIG. 1, the central portion of the top sheet 12 may freely rest upon the front side 26 in a non-affixed manner. Alternatively, the central portion of the top sheet 12 may become slightly spaced apart or separated from the front side 26 of the core layer 14 during release of the fluid 40. In an alternative embodiment, the central portion of the top sheet 12 may be joined to the core layer 14 at numerous points across the backing surface 38 and ribs 18 to limit and evenly regulate separation of the top sheet 12 from the core layer 14.

The top sheet 12 may be a formed film having a plurality of small holes or openings 34 therethrough. By way of example, the top sheet 12 may have approximately 10,000 holes per square inch. The top sheet 12 prevents the fluid 40 from being inadvertently discharged from the core layer 14, and isolates the core layer 14 from foreign materials. The top sheet 12 also facilitates controlled or metered delivery, and even, near uniform distribution, of the fluid 40 from the article 10 across the facing surface 36 of the top sheet 12. Alternatively, the top sheet 12 may constitute a fibrous material or composite structure of fibers and film. Optionally, the top sheet 12 may be constructed of a material exhibiting rough and wear resistant qualities, such as for applications in cleaning hard surfaces. The top sheet 12 may be formed similar to the top sheets described in U.S. Pat. No. 6,582,798 the complete disclosure of which is expressly incorporated by reference in its entirety.

Figure 2:
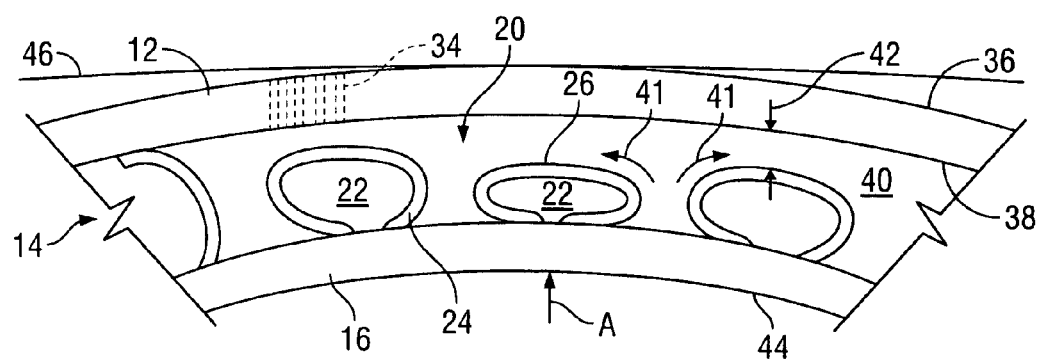
FIG. 2 is a cross sectional view of the article of FIG. 1 while a delivery pressure is applied to the article.

FIG. 2 illustrates the article 10 while a delivery pressure is applied to the article 10. The facing surface 36 of the top sheet 12 is placed against a target surface 46 and pressure is applied in the direction of arrow A to the back side 44 of the barrier layer 16. As pressure is applied to the barrier layer 16, the walls 24 of the 3D structure collapse and bow outward such that the volume within each cavity 20 reduces. As the voids 20 collapse, the fluid 40 is forced out of the voids 20 and flows across the front side 26 of the core layer 14 in the X- and Y-directions (parallel to the plane of the top sheet 12) as denoted by the flow arrows 41. The fluid 40 fills a separate gap 42 between the top sheet 12 and the front side 26 of the core layer 14 as the fluid 40 leaves the voids 20 (as denoted by the shading). The fluid 40 flows to the region of least resistance and thus continues to disperse across the back surface 38 of the top sheet 12 and becomes evenly distributed within the volume between the top sheet 12 and the barrier layer 16. Once the fluid 40 is sufficiently distributed across the backing surface 38 and continues to remain under pressure, the fluid 40 passes through the openings 34 in the top sheet 12. The voids 20, openings 34 and separation gap 42 cooperate to facilitate even metered discharge of the fluid 40. The fluid 40 evenly distributes across the facing surface 36 of the top sheet 12.

Figure 3:
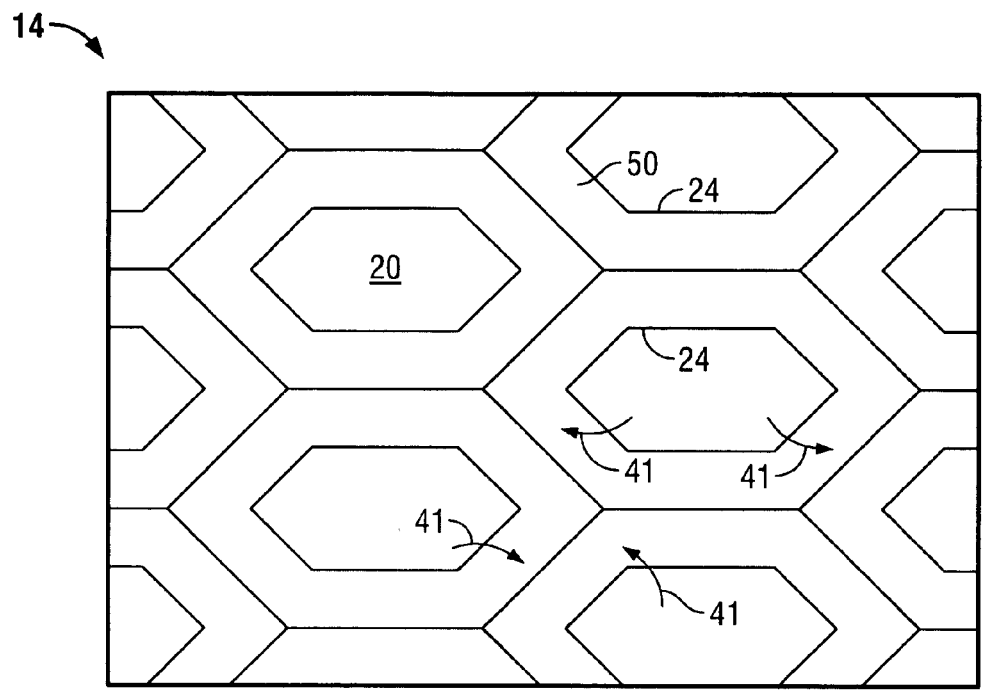
FIG. 3 is a top plan view of a portion of the article of FIG. 1.

FIG. 3 illustrates a partial top view of the core layer 14 to better show an exemplary pattern for the 3D structure of ribs 18. The ribs 18 includes a network of interconnecting lands 50 and walls 24 that surround the voids 20. In the exemplary embodiment of FIG. 3, the voids 20 are arranged in a hexagonal pattern and each cavity 20 has a hexagonal contour. Optionally, the overall pattern and/or the contour of each cavity 20 may have a different shape, such as circular, oval, elliptical, polygonal or other suitable patterns. Arrows 41 illustrate the flow pattern of the fluid 40 outward from the voids 20 in all directions based on pressure differentials.

Figure 4:
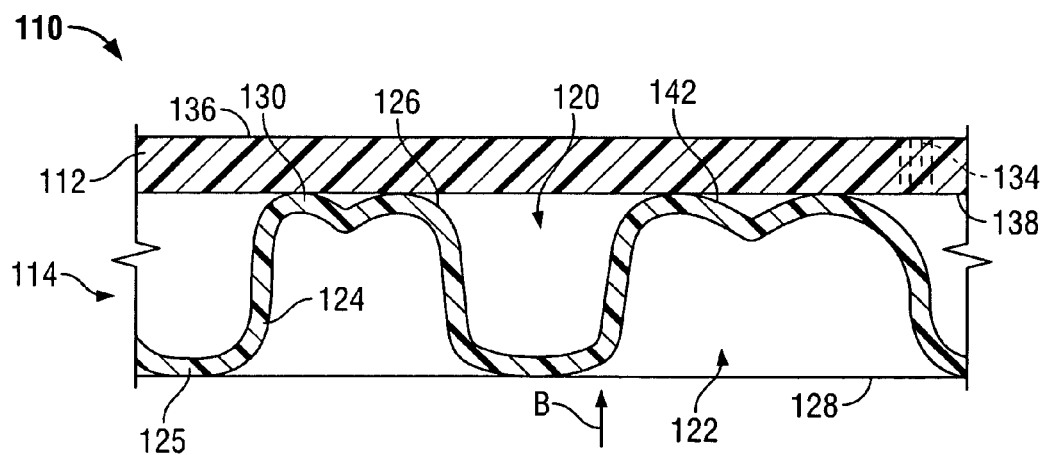
FIG. 4 is a cross sectional view of an article formed in accordance with an alternative embodiment.

FIG. 4 illustrates a cross section of an alternative embodiment for a storage and delivery article 110. The article 110 includes a top sheet 112 and a core layer 114 without a barrier layer (such as barrier layer 16 in the embodiment of FIG. 1). One exemplary application in which the delivery article 110 may not include a barrier layer is when the delivery article is attached to a mop or other applicator. The core layer 114 is non-apertured and includes walls 124 joined at an apex 130. The walls 124 have lower ends that are formed integral with base portions 125 that form bottoms for the voids 120. The walls 124 define interior cavities 122 facing toward, and opening onto, a back side 128 of the core layer 114. The walls 124 define fluid storage voids 120 that open onto the front side 126 and face the top sheet 112. The top sheet 112 may be joined to the core layer 114 about the perimeter of the article 110 such that the back surface 138 of the top sheet 112 freely rests on the front side 126 of the core layer 114 in a non-affixed manner. A separate gap 142 exists between the top sheet 112 and the core layer 114 that expands as pressure is applied to the back side 128 of the core layer 114 in the direction of arrow B.

When pressure is applied to the core layer 114, the base portions 125 collapse upward into the voids 120 to force there from the highly viscous fluid. The fluid flows through the openings 134 in the top sheet 112 in a distributed manner across the facing surface 138 as explained above. Optionally, a barrier layer may be provided across the back side 128, without being bonded to individual base portions 125.

Figure 5:
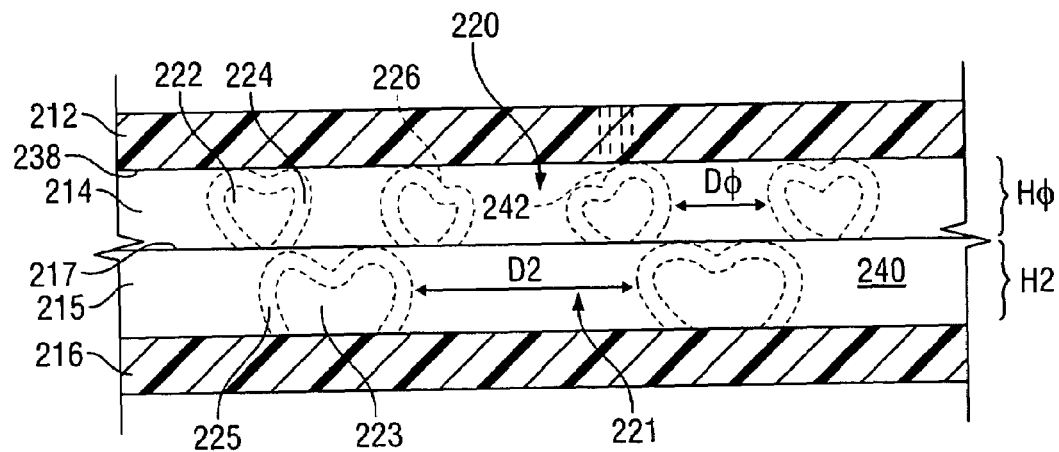
FIG. 5 is a cross sectional view of an article formed in accordance with an alternative embodiment.

FIG. 5 illustrates a cross section of an alternative embodiment for a storage and delivery article 210. The article 210 includes a top sheet 212, an upper core layer 214, a lower core layer 215 and barrier layer 216. The upper and lower core layers 214 and 215 are apertured, bonded to one another at interface 217, and have three dimensional structures that differ in size and mesh count. The upper core layer 214 is comprised of fluid storage voids 220 that are smaller, both in height H0 and in diameter D0 than the lower core layer 215. The lower core layer 215 has greater height H2 than height H0 and has voids 221 that are large in diameter D2 than diameter D0. The voids 220 and 221 communicate with one another such that fluid 240 passes freely between the voids 220 and 221 in a continuous manner.

The upper and lower core layers 214 and 215 include walls 224 and 225, respectively. The walls 224 and 225 surround interior cavities 222 and 223, respectively, facing and opening toward the barrier layer 216. The top sheet 212 may be joined to the upper core layer 214 about the perimeter of the article 210 such that the back surface 238 of the top sheet 212 freely rests on the front side 226 of the upper core layer 214 in a non-affixed manner. A separate gap 242 exists between the top sheet 212 and the upper core layer 214 that expands as pressure is applied to the barrier layer 216.

FIGS. 6–9 represent micrographs of an article 310 formed in accordance with an embodiment. The article 310 includes a top sheet 312, a core layer 314 and a barrier layer 316 similar to those described above. By way of example only, the core layer 314 may constitute a formed film that is commercially available from Tredegar Film Products Corporation, Richmond, Va., under the registered trademark AQUIDRY and the top sheet 312 may constitute a commercially available hydroformed, fine mesh film from Tredegar. The core layer 314 includes walls 324 that define fluid storage voids 320 there between. The lower ends of the walls 324 are bonded to the barrier layer 316. Optionally, the barrier layer may be permeable in certain applications.

Figure 6:
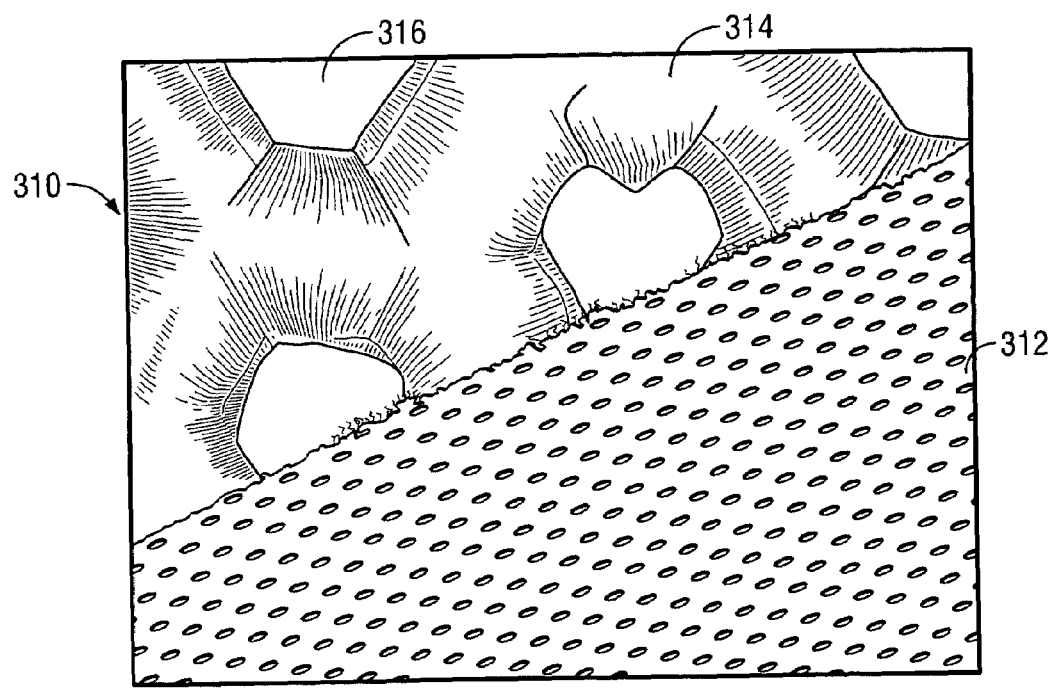
FIG. 6 is a top plan view of a micrograph of a portion of an article formed in accordance with an embodiment.
Figure 7:
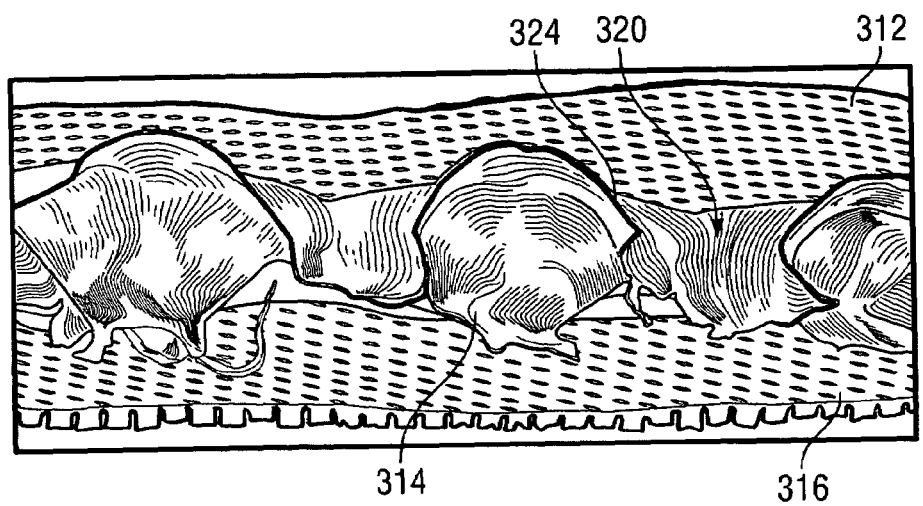
FIG. 7 is a cross sectional micrograph view of the article of FIG. 6.
Figure 8:
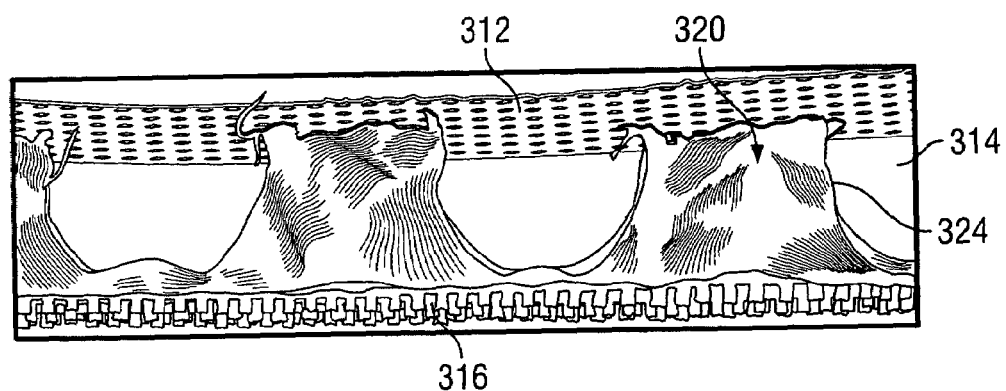
FIG. 8 is a cross sectional micrograph view of the article of FIG. 6.
Figure 9:
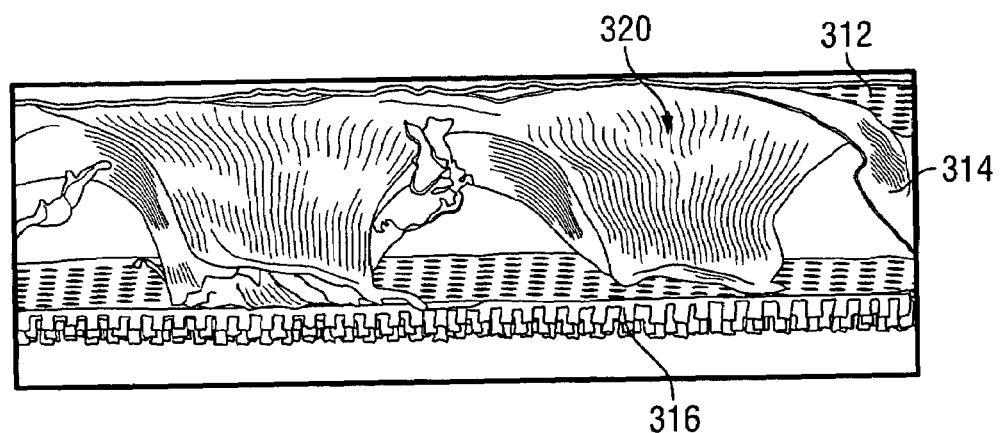
FIG. 9 is a cross sectional micrograph view of the article of FIG. 6.

FIG. 6 illustrates a top plan view of a portion of the article 310 with the top sheet 312 partially removed to expose the core layer 314 and barrier layer 316. FIGS. 7–10 illustrate cross sections of the article 310 with the layers partially pulled apart.

In testing, the article 310 has exhibited release percentages of at least 70% for a fluid having a viscosity of approximately 1000 centipoise.

Optionally, an additional barrier layer may be provided as a removable cover to place over the top sheet in order to entirely seal the article. The additional barrier layer would be impervious to the fluid and would be removable at the time that the article is to be used.

Test Method and Test Data

Tables 1 and 2 below set forth the results of testing of delivery articles to evaluate the ability of delivery articles when loaded with a viscous fluid to control the release of the fluid in a metered manner over time under controlled pressure. The test method may be used to evaluate the performance of cover layer products as well as core layer products.

TABLE 1

Airlaid Nonwoven Core with Various Apertured Film Covers

| Apertured Film Cover | Dry Wipe Wt. gm | Lotion Wt. gm | Released % |
|---|---|---|---|
| 8.75 Hex Cones In | 3.3 | 8.1 | 25 |
| 25 Hex Cones In | 3.2 | 8.0 | 35 |
| HFF 100 Cones In | 3.0 | 8.5 | 50 |
| 8.75 Hex Cones Out | 3.2 | 7.6 | 33 |
| 25 Hex Cones Out | 2.9 | 8.6 | 44 |
| HFF 100 Cones Out | 3.1 | 8.9 | 49 |

Table 1 illustrates the test results of six different test articles that utilize a non-woven core with various apertured film covers. Beginning in the first row, an airlaid non-woven core was combined with a film cover having 8.75 holes per linear inch in the cover. The apertures in the film cover were hexagonal-shaped and the cones within each aperture were directed inward away from the surface of the film cover toward the back side of the film cover. In the first exemplary test, the 8.75 Hex Cone film had a dry weight of 3.3 grams, was loaded with 8.1 grams of lotion and exhibited a release percentage of 25%. Hence, only 25% of the 8.1 grams of lotion was released from the non-woven core when covered with an 8.75 Hex Cone film cover.

Turing to the second tested article, again, a non-woven core was utilized in combination with an apertured film cover having 25 hexagonal-shaped apertures per linear inch with the cones of each aperture directed inward away from the front surface toward the rear surface of the film. The dry weight of the article was 3.2 grams. The article was loaded with 8.0 grams of lotion and the article exhibited a release percentage of 35%.

The next article comprised a non-woven core in combination with an apertured hydroformed film cover and comprising 100 holes per linear inch. The article had a dry weight of 3.0 grams, was loaded with 8.5 grams of lotion and exhibited a release percentage of 50%.

The next three articles also utilized non-woven cores in combination with film covers. The film covers utilized apertures extending in the opposite direction namely extending from the rear surface toward the front surface of the film. Corresponding dry weights, lotion quantities and percent releases are illustrated.

TABLE 2

8.75 Hex Apertured Film Core

| | | | |
|---|---|---|---|
| HFF 100 Cones In | 2.7 | 8.3 | 82 |
| HFF 100 Cones Out | 2.2 | 8.6 | 72 |

Table 2 illustrates test results of two articles, each of which utilized an apertured film core. The film core included a hole density of 8.75 holes per linear inch and the holes were hexagonal shaped. The apertured film core was then covered, for the first article, with a hydroformed film ("HFF") having 100 holes per linear inch and cones directed inward. The article had a dry weight of 2.7 grams, was loaded with 8.3 grams of lotion and exhibited a release percentage of 82%.

The final test article utilized an 8.75 Hex apertured film core and a cover constructed of a hydroformed film having a hole density of 100 holes per linear inch with cones directed outward. The article had a dry weight of 2.2 grams, was loaded with 8.6 grams of lotion and exhibited a release percentage of 72%.

In each test, delivery article was assembled with a backing layer, a core layer and a cover layer. The backing layer was a non-permeable barrier layer. The core layer of the articles tested in Table 1 were made of non-woven materials, while the articles tested in Table 2 were made with an apertured film. The cover layers were apertured films of different aperture sizes and mesh counts. A specified amount of viscous fluid was loaded into the core layer before the core layer was assembled with the cover layer. The backing, core and cover layers were secured to one another, (such as through staples or heat sealed) at four edges to prevent shifting of the layers through testing.

The delivery article, once loaded with fluid, was then compressed against dry absorbent pickup papers under controlled conditions. As the viscous fluid inside the core layer permeated outward through the cover layer, the viscous fluid was absorbed by the dry pickup papers and the weight of the pickup papers increased. By determining the weight increase over time of the pickup papers, the metering effect of the delivery article was evaluated.

The apparatus utilized in connection with this test included a template to cut out a barrier layer, core layer and cover layer. The dimensions of the template were 3 inches×8 inches×¼ inch. A sheer hang time roller was also used to apply the controlled pressure to the delivery article during the test. A measuring scale was utilized to measure the weight change of the pickup paper to the nearest 0.001 gram. The test fluid constituted Suave® Body Lotion sold by Unilever Corporation.

The sample preparation involved cutting the barrier layer, core layer and cover layer materials into 3×8 inch pieces and stacking the three layers in the correct sequence upon one another. The layers were then secured to one another through heat sealing along one edge. Next, the weight of the unloaded dry delivery article was measured to the nearest 0.001 gram. The cover layer was then folded back and 10 milliliters of the test fluid were applied onto the core layer using a pipette. The test fluid had a viscosity of 2000 cp in all example tests. The test fluid was spread evenly over the core layer until covering the entire surface of the core layer. The cover layer was then folded over the core layer and the three remaining edges of the barrier, core and cover layers were secured through heat sealing to one another. Next, the weight of the delivery article was recorded.

The test procedure involved weighing the dry weight (W0) of the dry pickup paper to the nearest 0.001 gram. The loaded delivery article was placed on a clean dry non-absorbent hard surface with the cover layer facing upward. The pickup paper was placed in contact with and on top of the cover layer. A sheer hang time roller was rolled across the pickup paper five cycles (ten passes) the weight (W1) of the pickup paper was measured and the weight gain was calculated by subtracting the dry weight from the wet weight of the pickup paper. Next, a new dry pickup paper was placed on top of the cover layer of the delivery article and the sheer hang time roller was again rolled across the delivery article five cycles. This process was repeated separately with new pick up papers until the weight gain by a new pickup paper was negligible. The cummulative weight gain of all the pickup papers was determined. Also, the weight of the delivery article was measured to determine the total test fluid weight loss from the delivery article.

While certain embodiments have been described above, those skilled in the art will recognize that other embodiments can be practiced with modification within the spirit and scope of the claims.

What is claimed is:

1. An article for dispensing a highly viscous fluid, comprising:
   a core layer containing an array of discrete three dimensional voids, said voids being configured to receive and store said highly viscous fluid, said core layer being formed of a material that is non-absorbent with respect to said highly viscous fluid; and
   a porous top sheet over said core layer, said top sheet being in fluid communication with said voids and having openings for permitting discharge of said highly viscous fluid from said voids;
   wherein said voids are defined by a plurality of walls that, when urged toward said top sheet, are collapsible in an outwardly direction to allow at least a plurality of said voids to be in fluid communication with each other.

2. The article of claim 1, wherein said core layer is formed of a three dimensional apertured film.

3. The article of claim 1, wherein said core layer comprises a three dimensional structure comprising at least walls extending in a Z-direction, said walls defining interior cavities which are fluidly isolated from said voids.

4. The article of claim 1, further comprising said highly viscous fluid held within said voids, said highly viscous fluid having a viscosity of at least 1000 centipoise.

5. The article of claim 1, wherein said voids are cylindrically shaped and flared outward proximate front and back sides of said core layer.

6. The article of claim 3, wherein, on average, the distance between said walls of adjacent cavities is less than the thickness of the core layer when in a non-compressed, resting state.

7. The article of claim 1, wherein said core layer comprises upper and lower core layers joined to one another.

8. The article of claim 1, further comprising a barrier layer, said core layer being disposed between said barrier layer and said top sheet.

9. The article of claim 8, wherein the barrier layer is impermeable to the highly viscous fluid contained in the core layer.

10. The article of claim 8, said core layer having a back side bonded to a joining side of said barrier layer, said barrier layer closing an open back end of said voids.

11. The article of claim 1, wherein said top sheet is freely provided over said core layer to permit fluid to flow during discharge from said voids across a backing surface of said top sheet along a separation gap between said top sheet and said core layer.

12. The article of claim 1, wherein said article is at least part of at least one of: (a) a personal care article to apply said fluid to skin; (b) a dermatological article; (c) an article to apply fluids to skin that hide or reduce stretch marks: (d) a medical article to apply topical medication, disinfectants or a pharmacological; (e) a cleansing article; and (f) a drug delivery article.

13. The article of claim 4, wherein said core layer discharges at least 70% of said fluid when said core layer is fully compressed during normal use.

14. The article of claim 1, said top sheet and core layer having a separation gap therebetween into which said fluid flows during discharge.

15. The article of claim 14, wherein fluid communication exists among the voids, openings of said top layer and separation gap.

16. The article of claim 5, wherein said voids have a height greater than their diameter.

* * * * *